United States Patent [19]

Giles et al.

[11] 3,740,537

[45] June 19, 1973

[54] MODIFIED INTEGRATE AND DUMP FILTER

[75] Inventors: George R. Giles, Williamsville, N.Y.; John A. Lockitt, Holliston, Mass.

[73] Assignee: GTE Sylvania Incorporated, New York, N.Y.

[22] Filed: Dec. 1, 1971

[21] Appl. No.: 203,545

[52] U.S. Cl. .................. 235/152, 328/162, 328/167

[51] Int. Cl. .................. G06f 1/02

[58] Field of Search .................. 235/152, 156, 183; 328/162, 167, 55, 54; 333/18; 325/42; 307/208

[56] References Cited

UNITED STATES PATENTS

| | | | |
|---|---|---|---|
| 3,659,086 | 4/1972 | Metcalf | 235/183 X |
| 3,639,848 | 2/1972 | Elliott | 328/167 |
| 3,639,739 | 2/1972 | Golden et al. | 328/167 X |
| 3,521,041 | 7/1970 | Van Blerkom et al. | 235/156 |
| 3,521,042 | 7/1970 | Van Blerkom et al. | 235/156 |
| 3,522,546 | 8/1970 | Jackson et al. | 328/167 |

*Primary Examiner*—Eugene G. Botz
*Assistant Examiner*—James F. Gottman
*Attorney*—Norman J. O'Malley, Elmer J. Nealon and David M. Keay

[57] ABSTRACT

A modified integrate and dump (I&D) filter employs an input terminal coupled to a selector gate through a plurality of data paths, each path including bit delay elements of different values. The output connection of the selector gate is coupled to a digital integrate and dump filter. Each of the data paths is selectively energized to vary the bit delay of selected data samples to thereby weight the value of the selected samples before supplying the samples to the I&D filter.

4 Claims, 2 Drawing Figures

Patented June 19, 1973

3,740,537

2 Sheets-Sheet 1

INVENTORS
GEORGE R. GILES
JOHN A. LOCKITT
BY David M. Keay
AGENT

Patented June 19, 1973 3,740,537

2 Sheets-Sheet 2

INVENTORS
GEORGE R. GILES
JOHN A. LOCKITT
BY David M. Keay
AGENT

MODIFIED INTEGRATE AND DUMP FILTER

BACKGROUND OF THE INVENTION

This invention relates to integrate and dump (I&D) filters and in particular to modified I&D filters useful for example in phase shift keying (PSK) receivers to reduce interference and cross talk.

The I&D filter response may be viewed as an amplitude weighted sum where each term is weighted by unity during integration and zero otherwise. When additional filtering at a specified frequency is required, a nonrecursive filter may be used to complement the I&D characteristics. The generalized transfer function, $H_F(Z)$, of an $n^{th}$ order nonrecursive filter is $$H_F(Z)=\sum_{m=0}^{n} a_m Z^{-m} \quad (1)$$

where the $a$'s are coefficients of the polynomial and $z^{-1}$ represents a unit delay over a predetermined sampling period.

One common implementation of this filter includes the use of a plurality of series connected delay elements and a plurality of series connected full adder circuits. Each of the common junctures of the series connected delay elements is connected through a weighting multiplier circuit as a second input to a separate one of the series connected adder circuit. The implementation has the obvious drawback of complexity in that for each filter zero desired a unit delay, a multiplier, and a full adder capable of handling a full digital word are required.

It would, therefore, be advantageous to have and it is one of the objects of the invention to provide a less complex nonrecursive filter to modify the characteristics of an I&D filter.

SUMMARY OF THE INVENTION

A nonrecursive filter to modify the characteristics of an I&D filter according to the present invention includes a variable delay means having an input terminal, an output terminal and a plurality of control terminals and being operative to incrementally delay a signal at its input terminal. The magnitude of the delay increment is dependent upon which of the control terminals is enabled.

A timing means, having a plurality of output connections each of which is coupled to a separate one of the control terminals, is operative selectively to generate enabling signals at its output connections to thereby select the increment of delay at the variable delay means. The output connection of the delay means is coupled to the input connection of an integrate and dump filter which accumulates the sum of the delayed signals over a predetermined interval.

BRIEF DESCRIPTION OF THE DRAWINGS

The construction and operation of the invention will be more fully understood from the following detailed description taken in conjunction with the accompanying drawing in which.

DETAILED DESCRIPTION OF THE INVENTION

An I&D filter has the following Z transform transfer function:

$$H_{ID}(Z)=b\sum_{r=0}^{s} Z^{-r} \quad (2)$$

where $b$ = *gain constant*
$s$ = number of samples per I&D period.

Combining both filters, [the I&D filter described by equation (2) and the nonrecursive filter described by equation (1)]

$$H_T(Z) = H_F(Z) \cdot H_{ID}(Z)$$
$$=b[a_0 + (a_0 + a_1)\ Z^{-1} + (a_0 + a_1 + a_2)\ Z^{-2} \ldots ] \quad (3)$$

Figure 1:
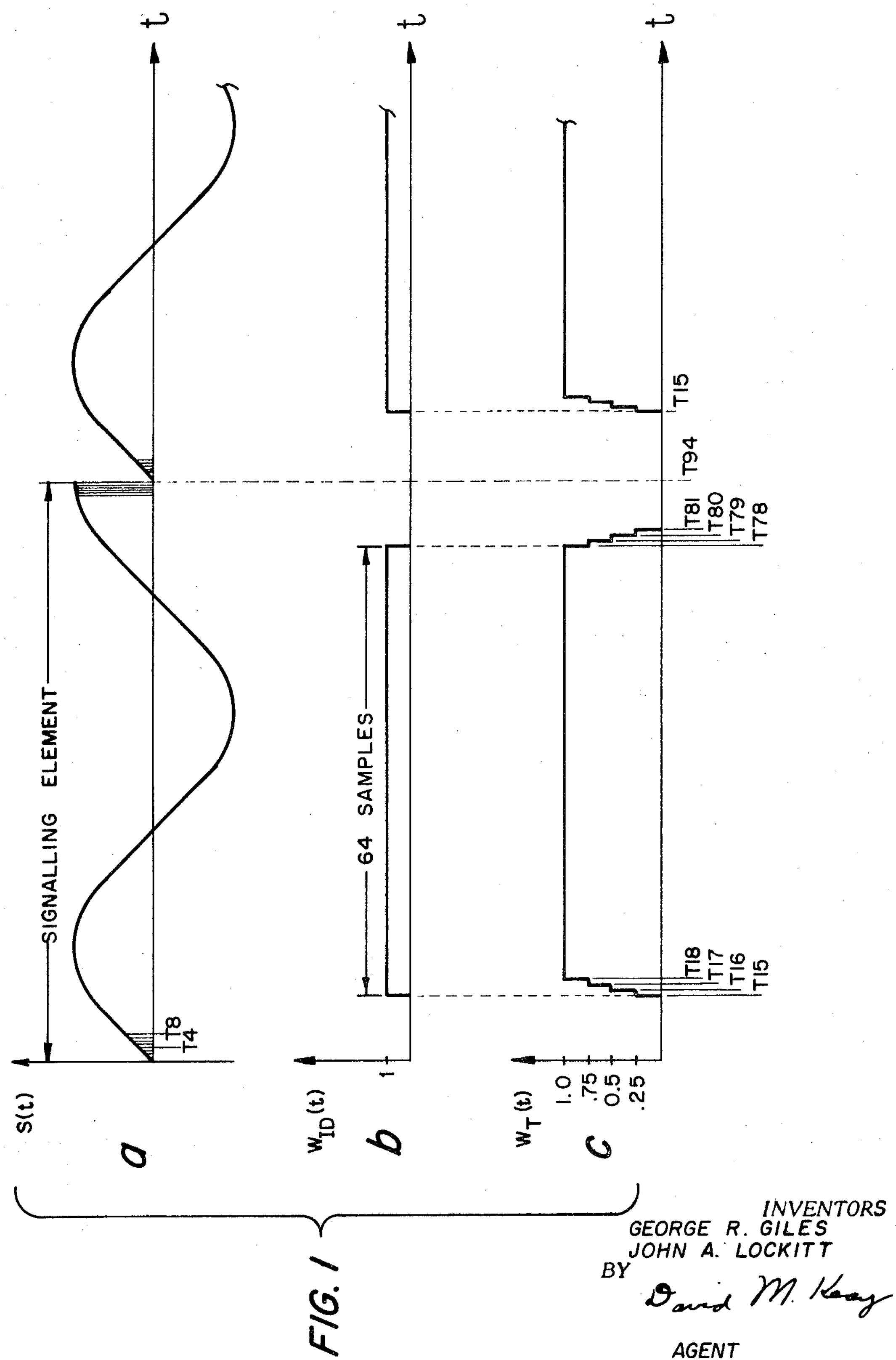
FIG. 1 includes waveforms useful in explaining the theory of a preferred embodiment of the invention.

To more clearly illustrate, a specific case will be examined in conjunction with the waveforms (a), (b), and (c) in FIG. 1. Waveform (a) of FIG. 1 represents a phase shift keyed signal which prior to being directed to the input of the nonrecursive filter is passed through an analog to digital (A/D) converter as represented by the T samples.

The amplitude weighting of a normal I&D filter used to detect the PSK signal appears in waveform (b) of FIG. 1. The duration of the integration, T64, in typically less than the signalling element, to reduce intersymbol influence in the detection. Thus the I&D filter has the well known sin$x$/$x$ frequency attenuation characteristic, with nulls occuring at $f_s/64$, $f_s/32$, $3f_s/64$, . . . , where $f_s$ is the sampling rate.

If, in addition to the desired PSK signal, undesired terms, for example those caused by interference, are received, these terms would not be eliminated by the I&D filter unless they fell on the nulls. Assuming, for the sake of illustration, interference in the frequency ranges of $f_s/4$, $f_s/2$, and $3f_s/4$, it is desirable to add attenuation to the filter characteristic in these areas. The nonrecursive filter with the transfer function $$H_F(Z) = 0.25\ (Z^{-3} + Z^{-2} + Z^{-1} + 1) \quad (4)$$

has zeros at $f_s/4$, $f_s/2$, and $3f_s/4$, and thus provides the necessary added attenuation needed in this case. The transfer function of the I&D filter is $$H_{ID}(Z)=\sum_{n=0}^{63} Z^{-n} \quad (5)$$

Adding the nonrecursive filter of equation (4), the resulting transfer function becomes $$H_T(Z)=.25+0.5Z^{-1}+.75Z^{-2}$$
$$+\sum_{n=3}^{63} Z^{-n}+.75Z^{-64}+0.5Z^{-65}+.25Z^{-66} \quad (6)$$

The I&D filter may be viewed as an amplitude weighted sum where each term is weighted by unity during integration and zero otherwise as shown in waveform (b) of FIG. 1. The amplitude weighting function for the combined filter is shown as waveform (c)

in FIG. 1 and follows directly from equation (6). As seen in waveform (c), modification of the I&D amplitude weighting function results in adding additional zeros to the filter characteristics. The number of steps in the staircase determines the number of zeros added and the amplitude of each of the steps determines the zero location.

Figure 2:
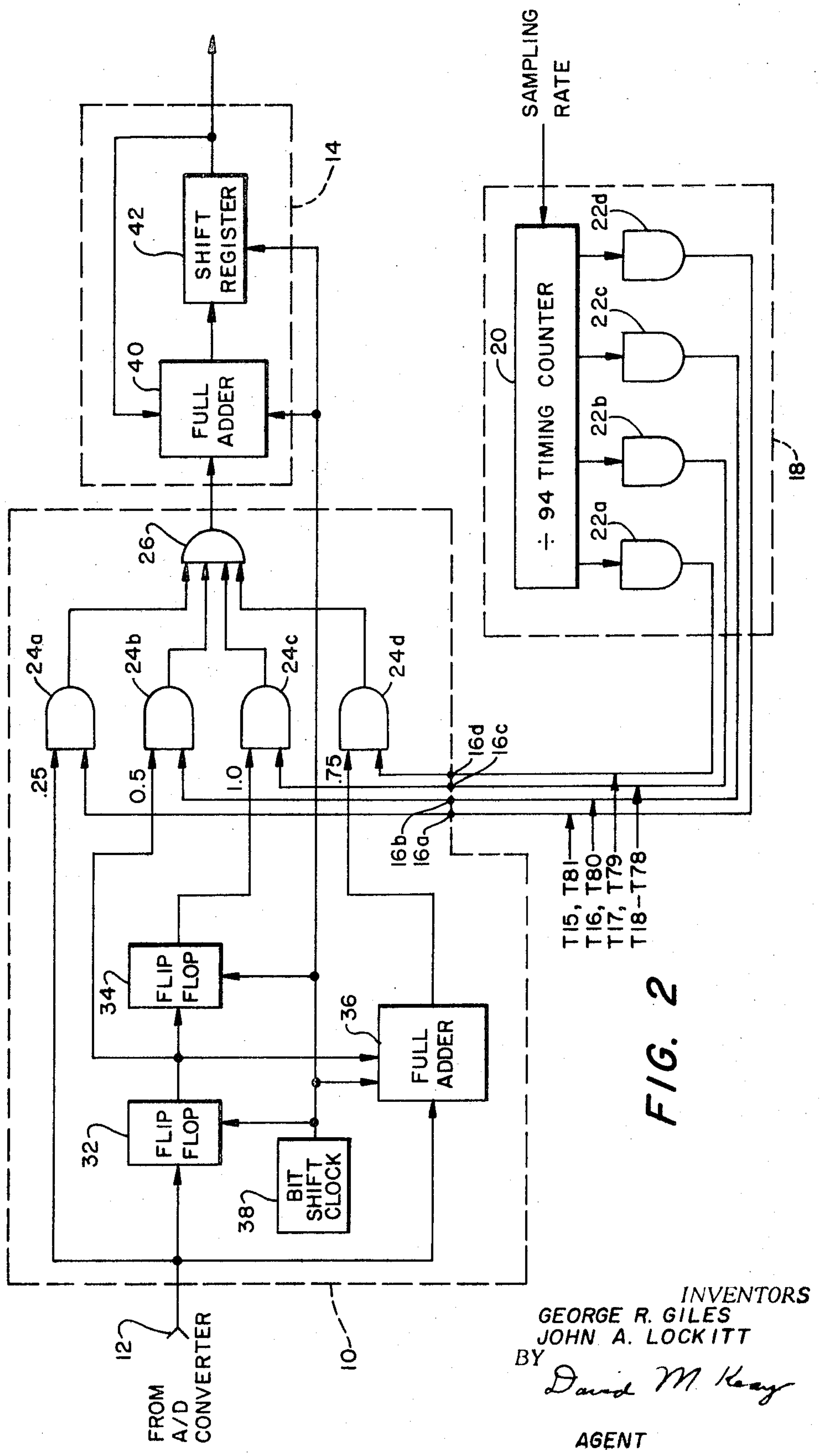
FIG. 2 is a block diagram of a modified integrate and dump filter according to the present invention.

One embodiment of a modified I&D filter, shown in block diagram form in FIG. 2, includes a variable delay means 10 having an input terminal 12 coupled to a signal source, for example an A/D converter (not shown). An output connection of the variable delay means 10 is coupled to the input connection of an I&D filter 14 and a plurality of control terminals 16*a*–16*d* having input connections from an enabling means 18 which includes a divide by 94 counter 20 and a plurality of decoding gates 22*a*–22*d*, well-known in the art.

The variable delay means 10 includes a plurality of gates 24*a*–24*d* having input connections connected to respective control terminals 16*a*–16*d* and output connections connected to an OR gate 26, the output connection of which is coupled to the I&D filter 14. The input terminal 12 is connected to the gate 24*a*, to the gate 24b through a first flip-flop 32, to the gate 24*c* through the first flip-flop 32 and a second flip-flop 34, and to gate 24d through a full added circuit 36. A second input connection to the adder circuit 36 originates at the output of the flip-flop 32.

The I&D filter includes a second full adder circuit 40 having an output connection connected to shift register 42, a first input connection connected to the output connection of the OR gate 26 and a second input connection connected to the output of the shift register 42. A bit shift clock 38 supplies bit shift pulses to the first flip-flops 32 and 34, the full adders 36 and 40 and to the shift register 42.

In operation, digital words describing the amplitude of an input signal (waveform (a) of FIG. 1) at the sampling instants are received in serial form with the least significant bit arriving first. The digital signals may come directly from an A/D converter or from other digital processing apparatus such as that employed in digital heterodyning. In implementing the modified I&D filter described by equation (6), the binary point of the full adder 40 is defined such that a full scale digital word when routed directly to the full adder 40 via gate 24*a* has an amplitude weighting of 0.25. A digital word delayed one bit position by the flip-flop 32 and passed to the full adder 40 via gate 24*b* is in effect shifted to the left one bit relative to the I&D full adder binary point resulting in a weighting of 0.5.

Similarly a digital word delayed by the combined action of the flip-flop 32 and the full adder 36 before being passed to the full adder 40 by gate 24*d* shifts the digital word one position to the left relative to the binary point of the full adder 40 and sums it with the unshifted word, resulting in a weighting of 0.75. A digital word delayed two bit positions by the combined action of the flip-flops 32 and 34 before being directed via gate 24c to the full adder 40 is shifted two bit positions to the left of the binary point resulting in an amplitude weighting of 1.0.

The digital word, representing the first sample to be integrated T15, arrives at the input terminal 12. (The samples To through T14 form part of a guard time to be discussed below.) At the same time the counter 20 output signal is decoded by the decoding gates 22*a*–22*d*, an enabling signal is generated at the gate 24*a*. The first sample is thus passed directly to the full adder 40 and is given an amplitude weighting of 0.25, as shown in the waveform (c) of FIG. 1 and as indicated in the first term of equation (6). The next digital word, representing the sample at T16 arrives at the input terminal 12. However, the gate 24*a* has been disabled and gate 24*b* enabled by the action of the counter 20 and decode gates 22*a*–22*d*. Note that this sample is delayed one bit by the flip-flop 32 before passing through the enabled gate 24*b*. At the full adder 40, this delay is equivalent to weighting the amplitude of the T16 sample by 0.50, as shown in waveform (c) of FIG. 1 and described in the second term of equation (6).

The digital word representing the T17 sample is delayed one bit and summed with itself by the combined action of the flip-flop 32 and the full adder 36 before passing through the enabled gate 24*d*. At the full adder 40, the delay of the T17 sample in effect weights the amplitude at 0.75, as shown in waveform (c) of FIG. 1 and as represented by the third term in equation (6). For samples T18 through T78 each digital word is delayed two bit positions by the combination of flip-flops 32 and 34 and directed through the only enabled gate 24*c* to the full adder 40 of the I&D filter 14. By delaying two bit positions, the digital word for each of these samples (T18 through T78) is shifted two positions to the left relative to the binary point of the full adder 40 resulting in an amplitude weighting of 1.0 [see waveform (c) of FIG. 1 and the fourth term of equation (6)].

When the digital word for the T79 sample arrives at the input terminal 12, gate 24*c* is disabled and gate 24*d* is once again enabled by the enabling means 18, resulting in an amplitude weighting of 0.75 as described hereinabove. Similarly gates 24*b* and 24*a* are sequentially enabled for samples T80 and T81, respectively, resulting in weighting factors of 0.50 and 0.25, in accordance with the sixth and seventh terms of equation (6).

The shift register 42 provides a delay of one sampling interval and stores the running sum of the integration. The summation of the digital samples over an interval *n*T is the sampled data equivalent of integration of the continuous signal over the same interval. At the end of the integration period, the digital word which represents the sum is read out and the shift register 42 is reset to zero (the dump operation). Between the end of one integration period and the start of the next (from T81 to T94 of one period and from T0 to T15 of the next period), there exists a guard time to reduce the cross talk and intersymbol interference.

While there has been shown and described herein one embodiment of a modified integrate dump filter, it will be obvious to those skilled in the art that various changes and modifications may be made therein without departing from the invention.

What is claimed is:

1. A nonrecursive filter to modify the characteristic of an integrate and dump filter comprising:

variable delay means having an input terminal, an output terminal and a plurality of control terminals and being operative to delay a signal at its input terminal in selected increments of predetermined magnitude, the particular increment selected being determined by which of said control terminals is enabled;

timing means having a plurality of output connections, each being coupled to a separate one of said control terminals and being operative to selectively generate enabling signals at its output connections to thereby select an increment of delay of particular magnitude in said variable delay means; and an integrate and dump filter means having an input connection coupled to the output connection of said variable delay means and an output connection and being operative to accumulate over a predetermined time interval the sum of the signals from said variable delay means;

said variable delay means including a plurality of gates, each having a first input connection connected to a separate one of said plurality of control terminals, a second input connection, and an output connection coupled to said integrate and dump filter means, each of said plurality of gates being operative to pass a signal at its second input connection to said integrate and dump filter means upon the receipt of an enabling signal at its first input connection; and a plurality of delay paths, each path having an input connection connected to said input terminal of said variable delay means, and an output connection connected to a separate one of the second input connections of said plurality of gates and each path being operative to delay a signal at said input terminal an increment of predetermined magnitude before directing said signal to said integrate and dump filter means.

2. A nonrecursive filter according to claim 1 wherein the signal at said input terminal of said variable delay means includes a series of digital words representing a predetermined number of samples of a signal over a predetermined interval, each of said words containing a predetermined number of data bits representing the amplitude of one sample.

3. A nonrecursive filter according to claim 2 wherein said plurality of delay paths include bit delay elements operative to delay on a bit basis said series of digital words.

4. A nonrecursive filter according to claim 2 wherein said integrate and dump filter means includes:

a full adder circuit means having a first input connection connected to the output connection of said variable delay means, a second input connection, an output connection and a binary reference point associated therewith and being operative to add signals at its first and second input connections with respect to said binary reference point; and a shift register having an input connection connected to the output connection of said full adder circuit and an output connection connected to the second input connection of said full adder circuit and being operative to accumulate over a predetermined period and on a sample by sample basis the sum of the sum of the signals at the output connection of said full adder circuit and to transfer the accumulated sum on a sample by sample basis to the second input connection of said full adder circuit.

* * * * *